United States Patent
Handberry

[11] Patent Number: 6,070,889
[45] Date of Patent: Jun. 6, 2000

[54] HANDLE DEVICE FOR STROLLERS AND BABY CARRIAGES

[76] Inventor: Le Roy Handberry, 346 Marion St., Brooklyn, N.Y. 11233

[21] Appl. No.: 09/083,228

[22] Filed: May 21, 1998

[51] Int. Cl.[7] ........................................ B62B 1/00
[52] U.S. Cl. .................. 280/47.315; 16/429; 280/47.38
[58] Field of Search ........................ 280/47.36, 47.371, 280/304.5, 293, 288.4, 47.34, 47.38, 657, 658, 47.315, 655.1, 642; 16/110.1, 900, 405, 113.1, 111.1, 426, 429

[56] References Cited

U.S. PATENT DOCUMENTS

| | | | |
|---|---|---|---|
| 1,042,193 | 10/1912 | Bowling | 280/47.36 |
| 1,829,629 | 10/1931 | Betancourt | 280/655.1 |
| 2,305,719 | 12/1942 | Lee | 280/658 |
| 2,617,670 | 11/1952 | Welsh | 287/14 |
| 2,816,775 | 12/1957 | Costello | 280/47.371 |
| 3,314,688 | 4/1967 | Guegold | 280/47.37 |
| 3,336,039 | 8/1967 | Chute et al. | 280/41 |
| 3,485,507 | 12/1969 | Christof | 280/293 |
| 3,697,095 | 10/1972 | Howell | 280/47.26 |
| 3,796,439 | 3/1974 | Perego | 280/36 R |
| 3,797,849 | 3/1974 | Sherman | 280/655.1 |
| 4,191,397 | 3/1980 | Kassai | 280/647 |
| 4,449,732 | 5/1984 | Surot | 280/644 |
| 4,479,665 | 10/1984 | Kassai | 280/644 |
| 4,618,157 | 10/1986 | Resnick | 280/8 |
| 4,639,012 | 1/1987 | Jensen | 280/642 |
| 4,946,180 | 8/1990 | Baer | 280/39 |
| 4,948,077 | 8/1990 | Gonzalez | 280/288.4 |
| 5,022,669 | 6/1991 | Johnson | 280/30 |
| 5,217,240 | 6/1993 | Gardenhour, Jr. et al. | 280/282 |
| 5,306,029 | 4/1994 | Kaiser, II | 280/30 |
| 5,318,311 | 6/1994 | Bofill | 280/30 |
| 5,370,408 | 12/1994 | Eagan | 280/33.994 |
| 5,549,311 | 8/1996 | Huang | 280/47.36 |
| 5,562,300 | 10/1996 | Nelson | 280/655.1 |
| 5,625,953 | 5/1997 | Huang | 16/115 |
| 5,765,855 | 6/1998 | Chiu | 280/642 |
| 5,921,574 | 7/1999 | Driessen et al. | 280/655.1 |

FOREIGN PATENT DOCUMENTS

| | | | |
|---|---|---|---|
| 825637 | 12/1951 | Germany | 280/47.36 |

*Primary Examiner*—Brian L. Johnson
*Assistant Examiner*—G B Klebe

[57] ABSTRACT

A new handle device for strollers and baby carriages for permitting pushing of the stroller or carriage from the side of the stroller or carriage. The inventive device includes a handle attached to a stroller or a carriage that is pivotably extendable to provide a side handle that may be used by a user to push the stroller or baby carriage from the side.

11 Claims, 3 Drawing Sheets

6,070,889

HANDLE DEVICE FOR STROLLERS AND BABY CARRIAGES

BACKGROUND OF THE INVENTION

1. Field of the Invention

The present invention relates to strollers and baby carriages and more particularly pertains to a new handle device for strollers and baby carriages for permitting pushing of the stroller or carriage from the side of the stroller or carriage.

2. Description of the Prior Art

The use of strollers and baby carriages is known in the prior art. More specifically, strollers and baby carriages heretofore devised and utilized are known to consist basically of familiar, expected and obvious structural configurations, notwithstanding the myriad of designs encompassed by the crowded prior art which have been developed for the fulfillment of countless objectives and requirements.

Known prior art strollers and baby carriages include U.S. Pat. Nos. 3,485,507; 3,336,039; 4,946,180; 4,191,397; 5,625,923; and 5,022,669.

While these devices fulfill their respective, particular objectives and requirements, the aforementioned patents do not disclose a new handle device for strollers and baby carriages. The inventive device includes a handle attached to a stroller or a carriage that is pivotably extendable to provide a side handle that may be used by a user to push the stroller or baby carriage from the side.

In these respects, the handle device for strollers and baby carriages according to the present invention substantially departs from the conventional concepts and designs of the prior art, and in so doing provides an apparatus primarily developed for the purpose of permitting pushing of the stroller or carriage from the side of the stroller or carriage.

SUMMARY OF THE INVENTION

In view of the foregoing disadvantages inherent in the known types of strollers and baby carriages now present in the prior art, the present invention provides a new handle device for strollers and baby carriages construction wherein the same can be utilized for permitting pushing of the stroller or carriage from the side of the stroller or carriage.

The general purpose of the present invention, which will be described subsequently in greater detail, is to provide a new handle device for strollers and baby carriages apparatus and method which has many of the advantages of the strollers and baby carriages mentioned heretofore and many novel features that result in a new handle device for strollers and baby carriages which is not anticipated, rendered obvious, suggested, or even implied by any of the prior art strollers and baby carriages, either alone or in any combination thereof.

To attain this, the present invention generally comprises a handle attached to a stroller or a carriage that is pivotably extendable to provide a side handle that may be used by a user to push the stroller or baby carriage from the side.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new handle device for strollers and baby carriages apparatus and method which has many of the advantages of the strollers and baby carriages mentioned heretofore and many novel features that result in a new handle device for strollers and baby carriages which is not anticipated, rendered obvious, suggested, or even implied by any of the prior art strollers and baby carriages, either alone or in any combination thereof.

It is another object of the present invention to provide a new handle device for strollers and baby carriages which may be easily and efficiently manufactured and marketed.

It is a further object of the present invention to provide a new handle device for strollers and baby carriages which is of a durable and reliable construction.

An even further object of the present invention is to provide a new handle device for strollers and baby carriages which is susceptible of a low cost of manufacture with regard to both materials and labor, and which accordingly is then susceptible of low prices of sale to the consuming public, thereby making such handle device for strollers and baby carriages economically available to the buying public.

Still yet another object of the present invention is to provide a new handle device for strollers and baby carriages which provides in the apparatuses and methods of the prior art some of the advantages thereof, while simultaneously overcoming some of the disadvantages normally associated therewith.

Still another object of the present invention is to provide a new handle device for strollers and baby carriages for permitting pushing of the stroller or carriage from the side of the stroller or carriage.

Yet another object of the present invention is to provide a new handle device for strollers and baby carriages which includes a handle attached to a stroller or a carriage that is pivotably extendable to provide a side handle that may be used by a user to push the stroller or baby carriage from the side.

Still yet another object of the present invention is to provide a new handle device for strollers and baby carriages that increases visibility of the pusher of a stroller or carriage to help reduce the risk of accidents involving the stroller or carriage due to people not seeing the stroller or carriage.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
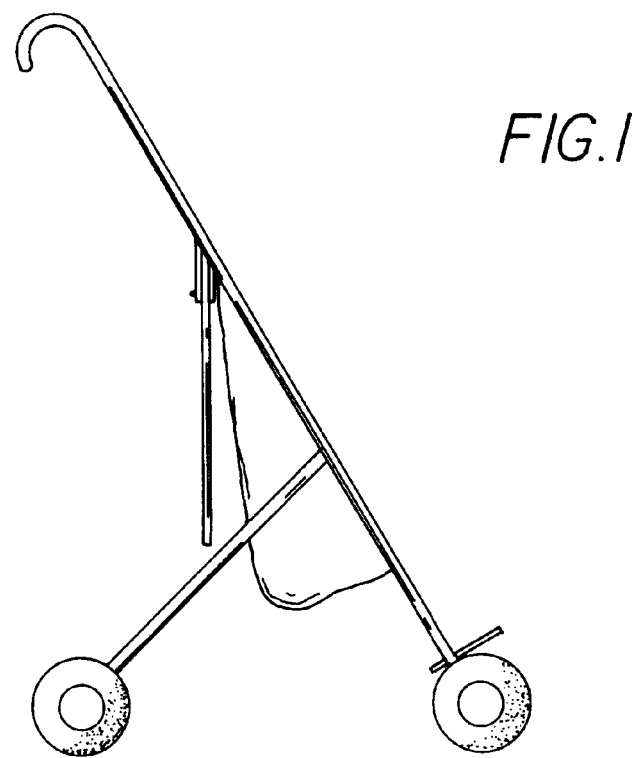
FIG. 1 is a schematic side view of the stroller embodiment present invention.

With reference now to the drawings, and in particular to FIGS. 1 through 6 thereof, a new handle device for strollers and baby carriages embodying the principles and concepts of the present invention will be described.

As best illustrated in FIGS. 1 through 5, the handle device for strollers and baby carriages generally comprises a handle attached to a stroller or a carriage that is pivotably extendable to provide a side handle that may be used by a user to push the stroller or baby carriage from the side.

In closer detail, the stroller embodiment 10 comprises :a seat 12 and a frame supporting the seat 12. The frame has ground engaging wheels 11 and a pair of spaced apart elongate rear handles 13,14. The seat 12 is positioned between the rear handles 13,14. Preferably, each handle has an upper handgrip portion 23.

Figure 2:
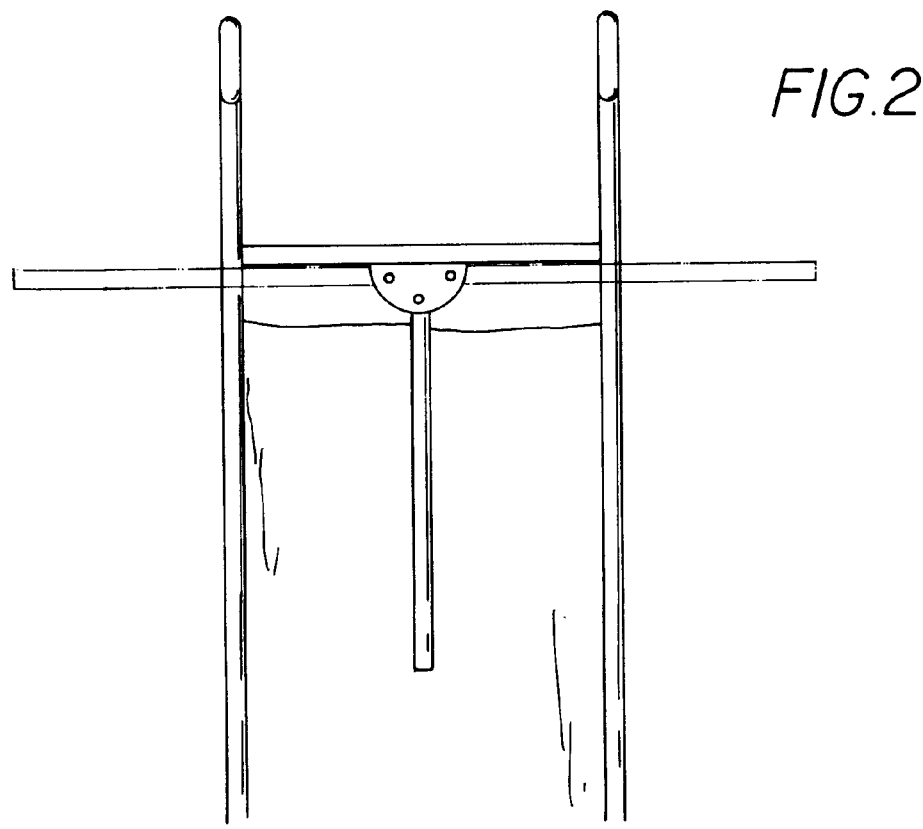
FIG. 2 is a schematic rear view of the stroller embodiment of the present invention.
Figure 5:
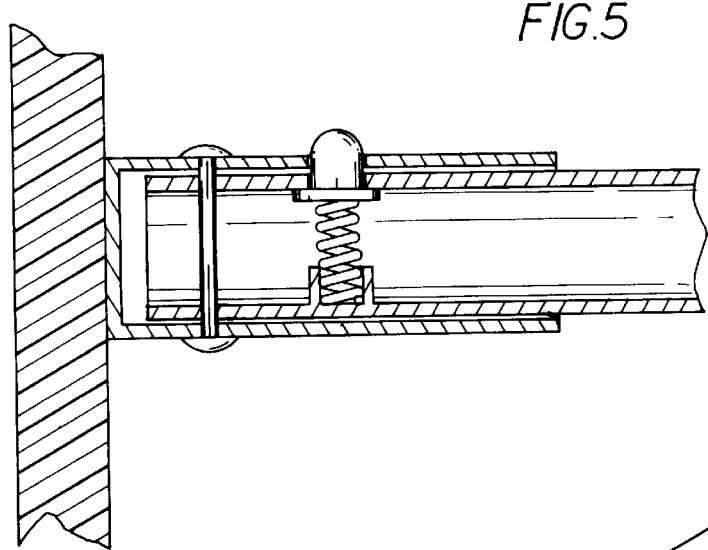
FIG. 5 is a schematic sectional view of the detail of the handle shaft pivot and hold means taken from lines 5—5 on FIG. 4.
Figure 6:
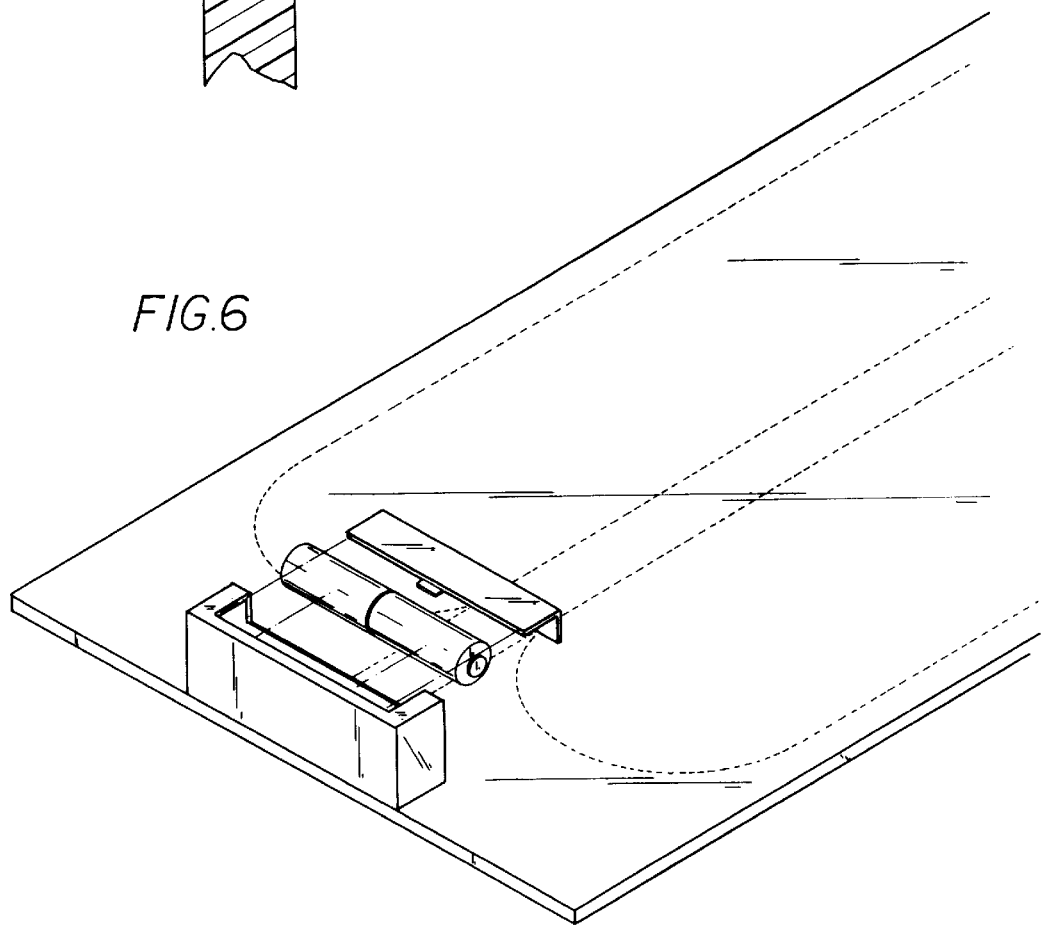
FIG. 6 is a schematic perspective view of the heating pad of the baby carriage of the present invention.

A cross bar 15 is extended between the rear handles 13,14 of the stroller 10. Preferably, the length of the cross bar 15 is substantially perpendicular to the lengths of the rear handles 13,14 of the stroller 10. The proximal end of an elongate handle shaft 16 is pivotally coupled to the cross bar 15 by a pivot bracket 17. Preferably, the proximal end of the handle shaft 16 is positioned at a mid point between the rear handles 13,14 of the stroller 10. As illustrated in FIG. 2, the handle shaft 16 is pivotable between a first lateral position 18 and a second lateral position 19. When the handle shaft 16 is in the first and second lateral positions 18,19, the length of the handle shaft 16 is generally parallel to the cross bar 15. The distal end of the handle shaft 16 is outwardly extended from one of the rear handles 13 of the stroller 10 when the handle shaft 16 is in the first lateral position 18 while the distal end of the handle shaft 16 is outwardly extended from the other rear handle 14 of the stroller 10 when the handle shaft 16 is in the second lateral position 19. Preferably, the handle shaft 16 is also pivotable to a storage position 20 between the first and second lateral positions 18,19. The length of the handle shaft 16 is substantially perpendicular to the cross bar 15 when the handle shaft 16 is in the storage position 20 as illustrated in FIG. 2. Preferably, hold means 21 is provided for releasably holding the handle shaft 16 in the first lateral position 18, the second lateral position 19 and the storage position 20. Ideally, the hold means 21 comprises a spring pin button as illustrated in FIG. 5 that is insertable into three holes 22 in the pivot bracket 17.

Figure 3:
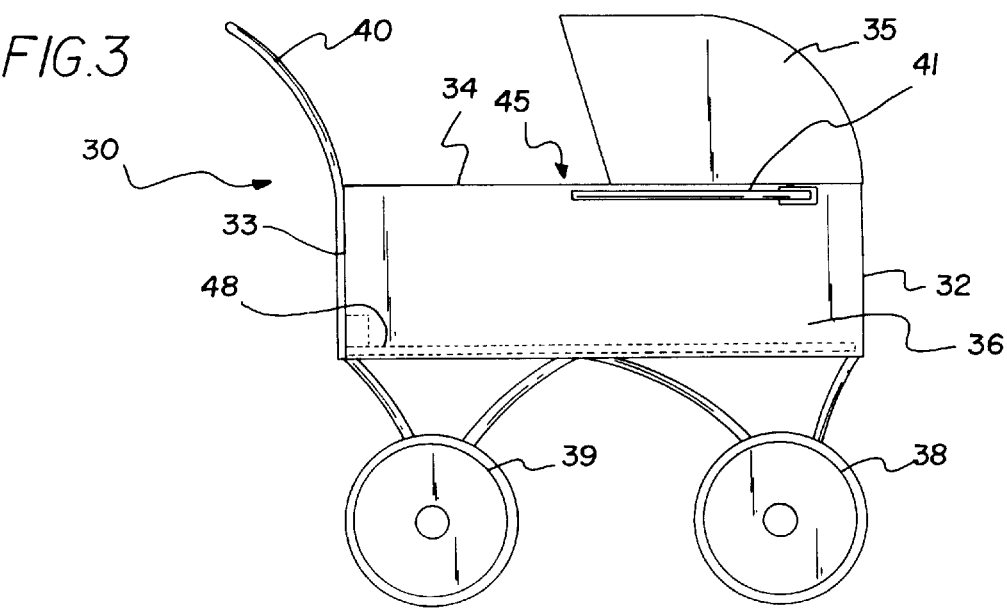
FIG. 3 is a schematic side view of the baby carriage embodiment of the present invention.
Figure 4:
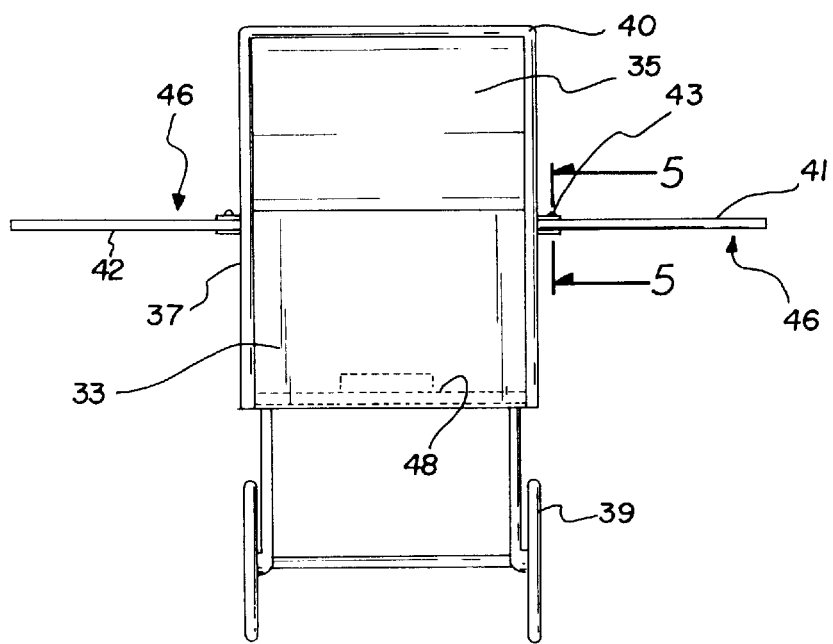
FIG. 4 is a schematic rear view of the baby carriage of the present invention.

With reference to FIGS. 3 and 4 the baby carriage embodiment 30 comprises a bassinet portion 31 having an interior space for holding an infant, a front 32, a back 33, a top 34, a bottom and a pair of sides 36,37 extending between the front 32 and back 33 of the bassinet portion 31. The top 34 of the bassinet has an opening into the interior space of the bassinet portion 31. The top 34 of the bassinet portion 31 may also include a hood 35 pivotally coupled thereto. The carriage also has front and back pairs of ground engaging wheels 38,39 rotatably mounted to the bottom of the bassinet portion 31. The front pair of wheels 38 is positioned towards the front 32 of the bassinet portion 31 while the back pair of wheels 39 is positioned toward the back 33 of the bassinet portion 31. The back 33 of the bassinet portion 31 has a push handle 40 is outwardly extended therefrom.

Elongate first and second lateral handles 41,42 are also included. Each has opposite proximal and distal ends and a length. The proximal end of the first lateral handle 41 is pivotally coupled to one of the sides 36 of the bassinet portion 31 by a pivot bracket 43 and a pivot pin 44. Preferably, the proximal end of the first lateral handle 41 is positioned towards the front 32 of the bassinet portion 31 and ideally, vertically aligned with the axle of the front pair of wheels. The proximal end of the second lateral handle 42 is pivotally coupled to another of the sides 37 of the bassinet portion 31 also by a pivot bracket and a pivot pin and is preferably positioned towards the front 32 of the bassinet portion 31 and ideally vertically aligned with the axle of the front pair of wheels. Each of the lateral handles is pivotable between a folded position 45 and a deployed position 46. As illustrated in FIG. 3, the length of each of the lateral handles is generally parallel with the associated side of the bassinet portion 31 when the lateral handle is in the folded position 45 so that the distal end of each lateral handle is extended towards the back 33 of the bassinet portion 31 when the lateral handle is in the folded position 45. As illustrated in FIG. 4, the length of each of the lateral handles is generally perpendicular with the associated side of the bassinet portion 31 when the lateral handle is in the deployed position 46, the distal end of each lateral handle is outwardly extended away from the associated side of the bassinet portion 31 when the lateral handle is in the deployed position 46. Like the stroller embodiment, preferably each lateral handle has hold means 47 for releasably holding the lateral handle in the folded position 45 and the deployed position 46. Ideally, as illustrated in FIG. 5, the hold means 47 comprises a spring pin at the proximal end of each lateral handle, the spring pin is extendable into a pair of holes is the pivot bracket 43 to hold the lateral handle in either the folded position 45 or the deployed position 46.

In the preferred embodiment of the baby carriage 30, a generally flat heating pad 48 is also provided in the interior space of the bassinet portion 31. The heating pad 48 has a heating element 49 provided therein for providing heat when energized to help keep the interior space warm. The heating pad 48 also has a battery 50 electrically connected to the heating element 49 to provide energy to energize the heating element 49.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A stroller, comprising:
    a seat;
    a frame supporting said seat, said frame having ground engaging wheels and a pair of spaced apart elongate handles, said seat being positioned between said handles;
    a lateral handle attachment comprising; a cross bar being extended between said handles of said stroller;
    an elongate handle shaft having opposite proximal and distal ends, said proximal end of said handle shaft being pivotally coupled to said cross bar;
    wherein said cross bar is substantially perpendicular to said handles of said stroller; and
    wherein said handle shaft is pivotable between a first lateral position and a second lateral position, said handle shaft being generally parallel to said ross bar when said handle shaft is in said first and second lateral positions, said distal end of said handle shaft being outwardly extended from one of said handles of said stroller when said handle shaft is in s aid first lateral position, said distal end of said handle shaft being outwardly extended from another of said handles of said stroller when said handle shaft is in said second lateral position.

2. The stroller of claim 1, wherein said handle shaft is pivotable to a storage position between said first and second lateral positions, said handle shaft being substantially perpendicular to said cross bar when said handle shaft is in said storage position.

3. The stroller of claim 2, further comprising hold means for releasably holding said handle shaft in said first lateral position, said second lateral position and said storage position.

4. The stroller of claim 3, wherein said proximal end of said handle shaft is positioned at a mid point between said handles of said stroller.

5. A baby carriage, comprising:
    a bassinet portion having an interior space for holding an infant, a front, a back, a top, a bottom and a pair of sides extending between said front and back of said bassinet portion;
    front and back pairs of ground engaging wheels rotatably mounted to said bottom of said bassinet portion, said front pair of wheels being positioned towards said front of said bassinet portion, said back pair of wheels being positioned toward said back of said bassinet portion;
    said back of said bassinet portion having a push handle being outwardly extended therefrom;
    elongate first and second lateral handles each having opposite proximal and distal ends and a length;
    said proximal end of said first lateral handle being pivotally coupled to one of said sides of said bassinet portion;
    said proximal end of said second lateral handle being pivotally coupled to another of said sides of said bassinet portion;
    wherein said proximal end of said first lateral handle is positioned towards said front of said bassinet portion, and wherein said proximal end of said second lateral handle is positioned towards said front of said bassinet portion.

6. The baby carriage of claim 5, wherein each of said lateral handles is pivotable between a folded position and a deployed position.

7. The baby carriage of claim 6, wherein the length of each of said lateral handles is generally parallel with the associated side of said bassinet portion when the lateral handle is in said folded position, said distal end of each lateral handle being extended towards said back of said bassinet portion when the lateral handle is in said folded position.

8. The baby carriage of claim 6, wherein the length of each of said lateral handles is generally perpendicular with the associated side of said bassinet portion when the lateral handle is in said deployed position, said distal end of each lateral handle being outwardly extended away from the associated side of said bassinet portion when the lateral handle is in said deployed position.

9. The baby carriage of claim 6, wherein each lateral handle has hold means for releasably holding the lateral handle in said folded position and said deployed position.

10. The baby carriage of claim 5, further comprising a generally flat heating pad being provided in said interior space of said bassinet portion, said heating pad having a heating element provided therein for providing heat when energized, said heating pad having a battery electrically connected to said heating element, said battery providing energy to energize said heating element.

11. A baby carriage, comprising:
    a bassinet portion having an interior space for holding an infant, a front, a back, a top, a bottom and a pair of sides extending between said front and back of said bassinet portion, said top of said bassinet having an opening into said interior space of said bassinet portion;
    front and back pairs of ground engaging wheels rotatably mounted to said bottom of said bassinet portion, said front pair of wheels being positioned towards said front of said bassinet portion, said back pair of wheels being positioned toward said back of said bassinet portion;
    said back of said bassinet portion having a push handle being outwardly extended therefrom;
    elongate first and second lateral handles each having opposite proximal and distal ends and a length;
    said proximal end of said first lateral handle being pivotally coupled to one of said sides of said bassinet portion, said proximal end of said first lateral handle being positioned towards said front of said bassinet portion;

said proximal end of said second lateral handle being pivotally coupled to another of said sides of said bassinet portion, said proximal end of said second lateral handle being positioned towards said front of said bassinet portion;

each of said lateral handles being pivotable between a folded position and a deployed position;

wherein the length of each of said lateral handles is generally parallel with the associated side of said bassinet portion when the lateral handle is in said folded position, said distal end of each lateral handle being extended towards said back of said bassinet portion when the lateral handle is in said folded position;

wherein the length of each of said lateral handles is generally perpendicular with the associated side of said bassinet portion when the lateral handle is in said deployed position, said distal end of each lateral handle being outwardly extended away from the associated side of said bassinet portion when the lateral handle is in said deployed position;

each lateral handle having hold means for releasably holding the lateral handle in said folded position and said deployed position; and a generally flat heating pad being provided in said interior space of said bassinet portion, said heating pad having a heating element provided therein for providing heat when energized, said heating pad having a battery electrically connected to said heating element, said battery providing energy to energize said heating element.

* * * * *